United States Patent [19]
Smith

[11] Patent Number: 5,178,252
[45] Date of Patent: Jan. 12, 1993

[54] TELESCOPIC CHUTE FOR A MIXER TRUCK

[76] Inventor: Felesta Smith, 3963 39th Ave., Sacramento, Calif. 95824

[21] Appl. No.: 685,918

[22] Filed: Apr. 16, 1991

Related U.S. Application Data

[63] Continuation-in-part of Ser. No. 519,935, May 7, 1990, Pat. No. 5,035,313.

[51] Int. Cl.⁵ .............................................. B65G 11/00
[52] U.S. Cl. .................................... 193/5; 193/6; 193/16
[58] Field of Search ................. 193/2 R, 2 A, 2 B, 5, 193/6, 16, 25 R, 25 A, 25 C

[56] References Cited

U.S. PATENT DOCUMENTS

| | | | |
|---|---|---|---|
| 2,095,494 | 10/1937 | Dobbs | 193/6 |
| 2,968,382 | 1/1961 | Oury | |
| 3,157,262 | 11/1964 | Chapdelaine | |
| 4,047,604 | 9/1977 | Daoust et al. | |
| 4,054,194 | 10/1977 | Davis | |
| 4,529,660 | 7/1985 | Heim | 193/2 R X |
| 4,634,285 | 1/1987 | Newberry | 193/25 R X |

FOREIGN PATENT DOCUMENTS 638520 12/1978 U.S.S.R.

*Primary Examiner*—D. Glenn Dayoan

[57] ABSTRACT

A linear extendable telescopic chute (10) pivotally mounted on a cement mixer truck (12) by a chute attachment structure (20). Chute (10) includes a first chute section (40) and a plurality of telescopically fitted movable chute sections (74, 76) structured of elongated open frames (78) having liners (86) removably affixed in the bottom interior of each open frame (78). Guide and support rails (70, 84) movably connecting one chute section to another are also preferably readily removable from the chute sections (40, 74, 76) for ease of replacement when worn. Inward and outward movement of the chute sections (40, 74, 76) relative to each other, is power operated through the use of multiple double-acting hydraulic rams (94 or 133) arranged to eliminate the need for long flexible hydraulic hoses. The hydraulic rams (94 or 133), and other powering devices (29, 36) used to move chute (10) up and down or left and right are controllable by way of a remote switching unit (18 or 148) used to actuate electric solenoid controlled valves (108) which control the flow of hydraulic fluid. The remote switching unit (18 or 148) cooperatively functions with control valves (108) to allow controllable powered movement of the telescopic chute (10) over a wide range of positions by the human operator while standing adjacent a dispensing end (16) of chute (10).

1 Claim, 12 Drawing Sheets

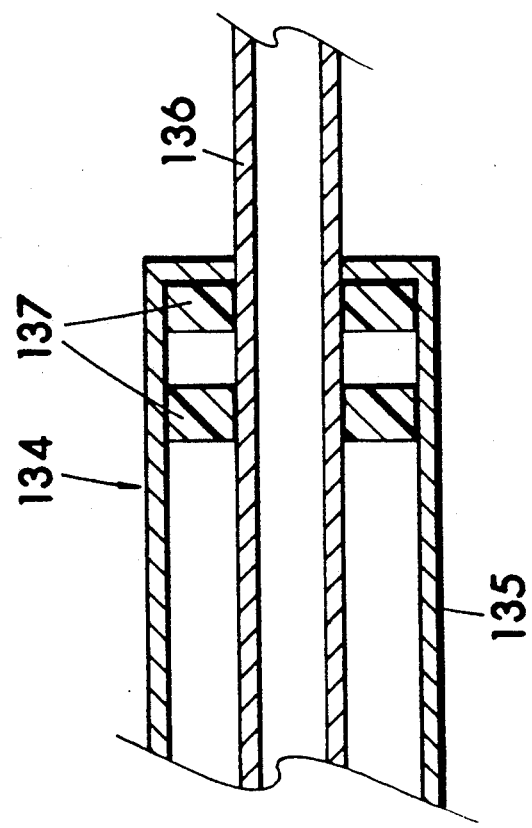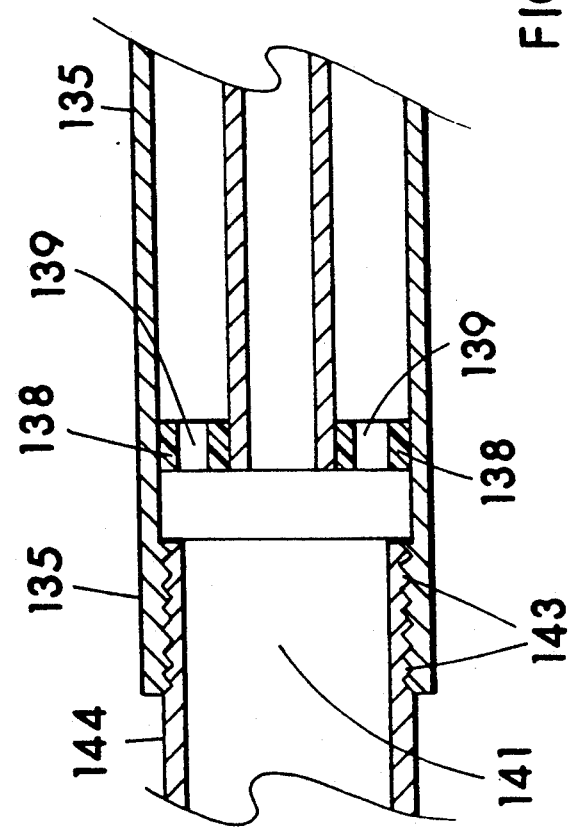
FIG. 9

TELESCOPIC CHUTE FOR A MIXER TRUCK

This is a continuation-in-part of my application U.S. Pat. No. 07/519,936 filed May 7, 1990 and issued Jul. 30, 1991 for "Telescopic Chute for a Mixer Truck".

BACKGROUND OF THE INVENTION

1. Field of the Invention

The immediate invention relates to linear extendable telescopic chutes used for directing and dispensing aggregate and cementitious materials from a mixer truck to a point remote from the truck. The telescopic chute of this disclosure is primarily adapted for use on vehicles such as large mixer or ready mix trucks of the type which normally mix, transport, and dispense freshly mixed cement and the like.

2. Description of the Prior Art

The majority of delivery chutes now in use for directing and dispensing cement and the like from mixer trucks are comprised of multiple separate trough-like sections which are manually hooked together at the beginning of each job to form one continuous extended chute. Once assembled, the chute receives the flowable cement or the like from the dispensing opening of the material containment drum of the mixer truck, and transports the cement using gravity feed a significant distance from the mixer truck. The hook-together chute sections are not only heavy, cumbersome, and somewhat dangerous due to the weight to assemble and disassemble, but require storage space on the exterior of the mixer truck after the job is completed, and require time to assemble and disassemble. Additionally, hook-together chutes usually require the truck to be repeatedly repositioned during a pour, and this repeated repositioning costs time and leads to excessive wear on the clutch of the truck.

In order to solve some of the problems associated with separate hook-together chutes which are not retractable or extendable in length without disconnecting or attaching chute sections, linear extendable telescopic chutes for dispensing cement or the like from a truck have been developed in the past. Telescopic chutes for directing cement from a ready mix truck are intended to increase the overall rate at which the cement may be dispensed; increase the accuracy of the dispensing; and reduce the amount of necessary repositioning of the truck by giving the chute the ability to extend and retract as opposed to requiring the truck to pull forward or move in reverse, or chute sections to be connected or disconnected.

Telescopic chutes are generally comprised of a plurality of telescopically connected chute sections which can be retracted into a more compact form for transportation on the mixer truck and for dispensing close to the truck, and extended along a longitudinal axis for dispensing substantially remote of the truck. Each chute section is formed with a permanently attached surface, usually trough shaped, to direct the flow of cement through the chute sections. The permanently attached surfaces used to direct the flow of cement are normally of relatively thin metal permanently attached to some type of rigid frame or support structure designed to support the substantial weight of the chute and cement when flowing through the chute.

Although telescopic chutes for dispensing aggregate mixtures from mixer trucks are not new to the industry, the use of telescopic chutes has not gained any appreciable popularity up to the present due to long standing problems which have made the use thereof both inconvenient and excessively expensive for profitable use. One major problem associated with past art telescopic chute structures for mixer trucks has been the cost of maintenance over an extended period of time. Aggregate materials containing rock and sand are extremely abrasive, and the chemicals and water mixed with the rock to form cement are corrosive to the trough shaped surfaces which direct the flow of the cement. Abrasion and corrosion of these surfaces significantly reduces the functional lifespan often to less than eighteen months. Abrasion from the rock and sand also greatly reduces the functional lifespan of sliding interlocks and support rails typically used on telescopic chute structures. Telescopic chute structures are quite expensive to build or purchase when compared to the more simple and conventional hook-together chute structures, and when the sections of the telescopic chute are worn, it is seen to be prohibitively expensive to replace the chute sections, particularly when replacement may be necessary every 18 months or so.

Another problem associated with past art telescopic chutes for mixer trucks has been a suitable method of telescopically extending the chute outward under power 5 to 7 meters from the truck, and to be able to retract the chute into an acceptable shortened length of 2 meters or so to allow the chute to remain attached to the truck while the truck travels on a highway to the location where the cement is to be dispensed.

Single, hydraulically operated linear extendable double-acting push cylinders or rams have been used in the past on telescopic chutes for trucks to extend and retract the chute, but this with only limited success. The problem with a single hydraulic ram is that the maximum length the ram can extend is limited by the length of the outer housing of the slidable cylinder rod of the ram. The ram cannot extend to an overall length more than twice the length of the cylinder rod housing, and actually most rams are extendable to substantially less than twice the length of the cylinder rod housing since a portion of the slidable cylinder rod must remain within the housing at all times for stability.

An example of a past art telescopic chute having both the disadvantage of permanently attached surfaces to direct the flow of cement through the chute, and the use of a single hydraulically operated ram as the method of extending and retracting the telescopic chute may be examined in U.S. Pat. No. 2,968,382 issued to J. F. Oury on Jan. 17, 1961. The Oury patent teaches a telescopic chute for a ready mix truck which is seen to have a number of disadvantages which would make the structure excessively inconvenient and costly for practical use.

Although one may imagine that a single telescopic hydraulic push cylinder may be able to be utilized as a suitable method of extending a telescopic chute to achieve the approximate 3 or 4 to 1 extension-to-retraction ratio deemed to be optimal for the delivery chute of a ready mix truck, one should consider that by far the vast majority of available telescopic hydraulic rams are only single-acting, that is, they will power out to a greatly extended position, but require another force such as weight or gravity to push them back into a retracted position. This usually requires a telescopic ram to be vertically oriented in use, which is not feasible with a telescopic chute on a mixer truck wherein the chute is positioned horizontally or at a downward angle. Additionally, although double-acting telescopic hydraulic rams have been invented which would physically accomplish some of the desired results on a telescopic chute of a mixer truck, double-acting telescopic rams are quite complicated, rare, and are very costly to purchase when compared to standard double-acting rams or even single-acting telescopic hydraulic rams.

The use of multiple standard double-acting hydraulic rams, essentially one double-acting ram per each movable section of chute would also generally physically accomplish some of the desired results on a telescopic chute of a mixer truck, however, in using a plurality of double-acting rams, in order to feed hydraulic fluid under pressure to the outer most rams, ordinarily the situation would require long hanging loops of flexible hydraulic hoses necessary to actuate the rams and to reserve sufficient length in the hosing to allow the chute to extend from a retracted position to an extended position, this being due to some of the ram housings moving outward away from the truck as the chute is extended. The long hanging loops of flexible hydraulic hoses under a telescopic chute are undesirable for a number of reasons including kinking in the hoses and undue wear on the hoses as they drag across the ground or through the freshly poured cement leaving marks therein.

L. P. Chapdelaine was issued U.S. Pat. No. 3,157,262 on Nov. 17, 1964 for a telescopic chute. Chapdelaine addressed the problem of being able to sufficiently shorten his telescopic chute while being able to extend the chute to an acceptable and practical length for dispensing without having the problem of long hanging loops of flexible hydraulic hoses. Chapdelaine's approach was to use one double-acting hydraulic ram attached to the first and the second chute section wherein the cylinder rod housing positioned adjacent the truck would remain relatively stationary, and therefore the hoses could be kept relatively short. Additionally, Chapdelaine utilized a complicated system of multiple cables and pulleys actuated by movement in the one hydraulic ram to extend and retract additional telescopic chute sections positioned further from the truck. Although the Chapdelaine cable system for a telescopic chute would function to extend and retract the chute, cables are notorious for slipping, fraying when exposed to sand or gravel, and have been known to inadvertently jump pulleys or cut off human fingers when caught between a pulley and cable.

An additional problem with past art telescopic chutes for ready mix trucks has been the ability to quickly, accurately and conveniently control the movement of the chute, and more importantly the dispensing end of the chute which determines precisely where the cement or other flowable material is deposited. This problem is due to the normal placement of the chute movement control levers or switches being on the truck. The truck does not seem to be the ideal position for controlling movement of the chute when the dispensing end of the chute may be 7 or more meters away, and normally already has a person standing nearby attempting to monitor the discharge from the chute, and to hand-signal a second person standing at the controls on the truck. This control problem is evident during virtually all cement pouring, but is particularly evident when pouring a stem wall where the forms may only be 15 centimeters apart, and the cement must all be shot into this narrow space between the forms. The dispensing of cement is always best when accomplished quickly and accurately, since usually there is more than one cement finisher waiting to finish the poured cement, and it requires additional labor and time to shovel misplaced cement to where it belongs.

When a telescopic chute is in the extended position, with the dispensing end of the chute possibly 7 meters from the truck, the distance from the truck-mounted controls to the dispensing end of the chute is one which is quite difficult to quickly and accurately judge whether the cement is flowing in the proper place, and make quick and proper adjustments to where it is being dispensed, before some of the cement has been deposited in the wrong location. When a stem wall is being poured using a telescopic chute, the mixer truck in theory should be able to sit stationary for a extended portion of the pour. When pouring a stem wall, the telescopic chute is normally moved along sideways over the top of the forms. The sideways movement may be accomplished simply by manually pulling on a handle attached to the dispensing end of the chute, and thereby pivot the chute about a vertical axis, or by controllable powered motors connected to pivot the chute about a vertical axis. In moving the chute sideways, the chute usually must be continuously shortened or lengthened at the same time the dispensing end of the chute must be raised or lowered in order to maintain the dispensing end of the chute directly over the center of the narrow space between the forms. The raising or lowering of a chute must be accomplished by controllable powered devices such as hydraulic rams due to the weight. Additionally due to the weight, the inward and outward movement of the telescopic chute must be accomplished by controllable powered methods. It should be kept in mind that these movements in the dispensing end of the telescopic chute may be occurring at distances up to 7 or more meters from the truck. This multi-directional movement of the chute, that is, varying the length thereof at the same time the chute is being moved sideways and upward or downward is very difficult to perform quickly and accurately from the controls mounted on the truck with or without receiving hand-signals from a second person standing adjacent the dispensing end of the chute.

An example of a telescopic chute on a mixer truck which has the control levers attached to the truck may be examined in U.S. Pat. No. 4,047,604 issued on Sept. 13, 1977 to R. R. Daoust and T. N. Daoust. The Daoust telescopic chute is attached to a type of mixer truck which dispenses over the front operator's cab of the truck as opposed to the more common mixer trucks which dispense from the rear end of the truck. The controls for the Daoust telescopic chute are positioned within the cab of the truck, giving the truck operator the ability to control the powered movement of the chute for modes including moving the chute left and right, in and out, and up and down. It should be noted Daoust does not disclose how the telescopic chute is structured in any detail.

SUMMARY OF THE INVENTION

The immediate invention of this disclosure is an improved linear extendable telescopic chute and control arrangement therefor, and is for use on a cement ready mix or mixer truck. The telescopic chute includes a plurality of open chute frames telescopically and movably fitted together preferably using readily replaceable bolted-on guide and support rails to affix the frames movably together. Each of the open chute frames are fitted with a readily replaceable trough shaped liner bolted to the interior thereof, with the liners serving to guide and take the abuse of the flowing cement. A readily removable relatively thin liner proves much less costly to replace than an entire chute section which requires substantially heavy and rigid material for strength, and when the liners are surfaced with, or entirely made of a plastic such as polyurethane, the liners are significantly more durable and easily cleaned as compared to metal.

Retraction and extension of my telescopic chute is power operated through the use of a plurality of attached linear extendable double-acting hydraulic rams. The hydraulically actuated rams are specifically arranged in a manner to eliminate undesirable problems associated long hanging loops of flexible hydraulic hoses.

The hydraulically actuated rams used to extend and retract the chute, and other powering devices used to move my chute up or down or left and right are controllable through remote switching used to actuate electric solenoid controlled hydraulic valves which control the flow and the direction of the flow of the hydraulic fluid to the powering devices. The remote held-held switches are positionable to allow a human operator to stand adjacent the dispensing end of the chute, and conveniently and accurately control the position of the chute through a wide range of powered movement, and optionally, control the direction of the spinning of the drum of the mixer truck in order to start and stop the flow of cement into the chute.

The immediate invention of this disclosure is one which is specifically structured to reduce component wear of the chute; reduce worn component replacement costs; increase the overall rate at which cement may be dispensed; increase the accuracy of the cement dispensing; and to reduce the amount of necessary truck repositioning in order to provide a truly practical and safe chute for a mixer truck.

Although my telescopic chute is shown in the appended drawings attached to the back end of a mixer truck which dispenses from the back end thereof, my chute structure will also function well when mounted on the less common type of mixer truck which dispenses from the front end of the truck over the operator's cab.

BRIEF DESCRIPTION OF THE DRAWINGS

FIG. 9 is a cross-sectional view of a telescopic hydraulic line which may be used as part of the invention to feed fluid to conventionally structured double-acting hydraulic rams;

BEST MODE FOR CARRYING OUT THE INVENTION

Figure 1:
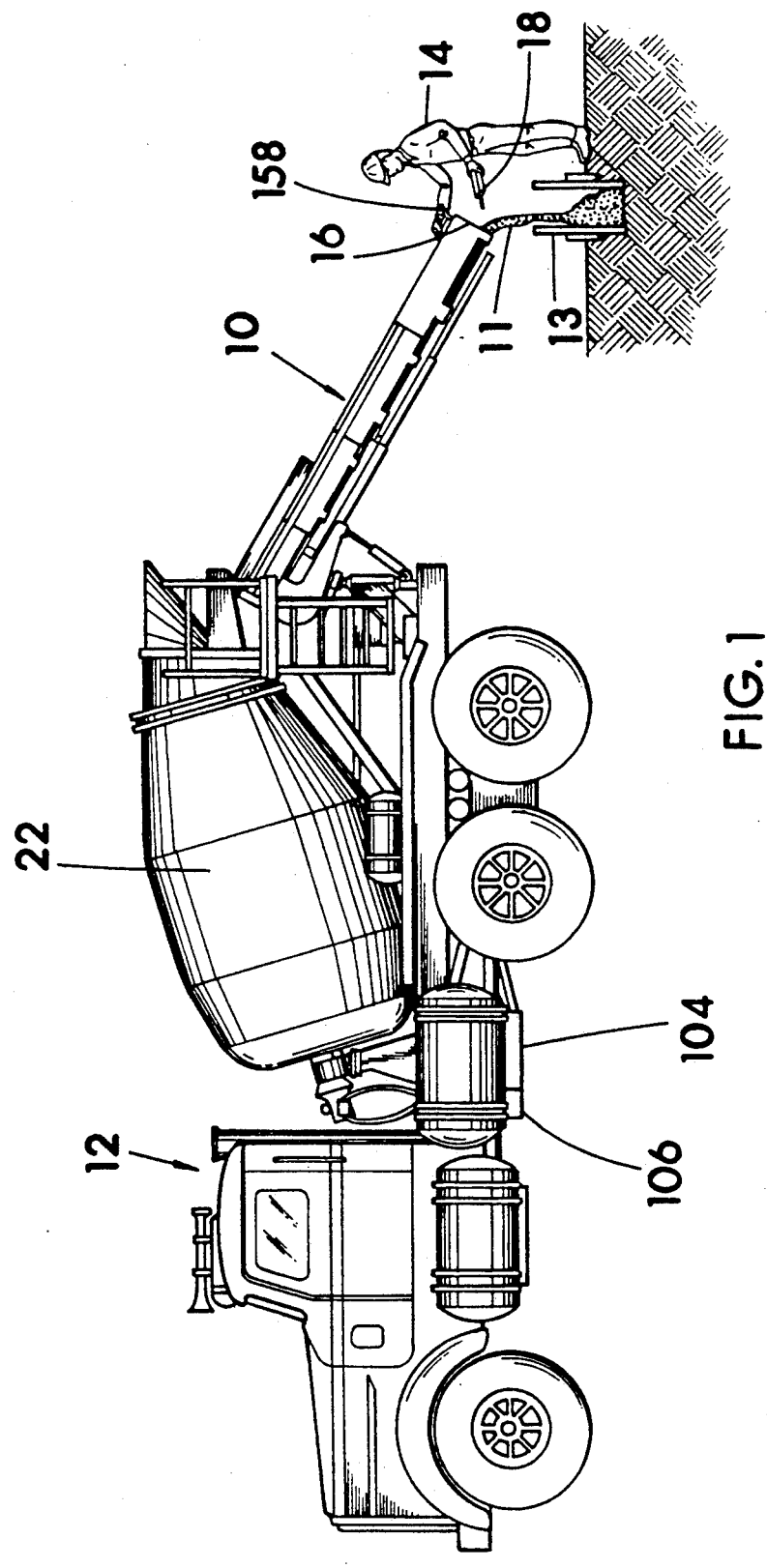
FIG. 1 illustrates my preferred telescopic chute structure attached to a mixer truck.

Referring now to the drawings in general where the immediate invention is shown, and to FIG. 1 where my telescopic chute 10 is shown affixed to a mixer truck 12. In FIG. 1, chute 10 is in the extended position, and is being used for dispensing cement 11 between forms 13 for a stem wall of a building foundation. A human operator 14 is shown standing adjacent the dispensing end 16 of chute 10, and is controlling the movement of chute 10 with the use of a wire-less hand-held remote switching unit 18.

Chute 10 is attached to truck 12 with a chute attachment structure 20 which allows for chute 10 to be pivoted about a vertical axis to allow swinging dispensing end 16 left and right of truck 12, and additionally to be pivoted about a horizontal axis to allow raising and lowering dispensing end 16 or essentially changing the slope of chute 10. The chute attachment structure 20 best shown in FIG. 2 and 3 is but one of many suitable chute attachment structures, with the mounting arrangements sometimes needing to be structurally modified dependant on different models and makes of trucks 12, and dependant on whether drum 22 dispenses from the rear of the truck 12 as shown in FIG. 1, or dispenses over the front of the truck which is not shown in the drawings, but is well known in the industry.

Generally in any situation, the general principles of chute attachment structure 20 would be about the same, and are somewhat well know to the industry. Chute attachment structure 20 in the example shown in the drawings is comprised of a metal tube 24 supported by one or more metal bracing members 26 each affixed to truck 12 and to tube 24. Extending vertically through tube 24 is a metal shaft 28 which is rotatably retained to allow rotation thereof about a vertical axis. A portion of shaft 28 extending below tube 24 has an attached yoke 30 for the attachment of the cylinder rod housing end of a hydraulic push cylinder 29 which is utilized for pivotally lifting and lowing dispensing end 16 of chute 10. A portion of shaft 28 below yoke 30 is affixed with a gear 32. Gear 32 is affixed stationary to shaft 28, and is meshed with a gear 34 which is rotatably drivable by a reversible hydraulically actuated motor 36 or similar controllable powering device capable of rotating shaft 28 clockwise or counterclockwise as desired. A portion of shaft 28 below gear 32 is rotatably supported in a thrust bearing 33 or other stabilizing structure affixed to a portion of truck 12 such as the frame. The upper end of shaft 28 extends above tube 24 attaching securely to one end of a strong steel support arm 38. The other end of support arm 38 is pivotally connected to the first chute section 40 of chute 10. The rotation of shaft 28 by motor 36 causes left or right swinging in chute 10 depending on the direction of the rotation of shaft 28.

Figure 2:
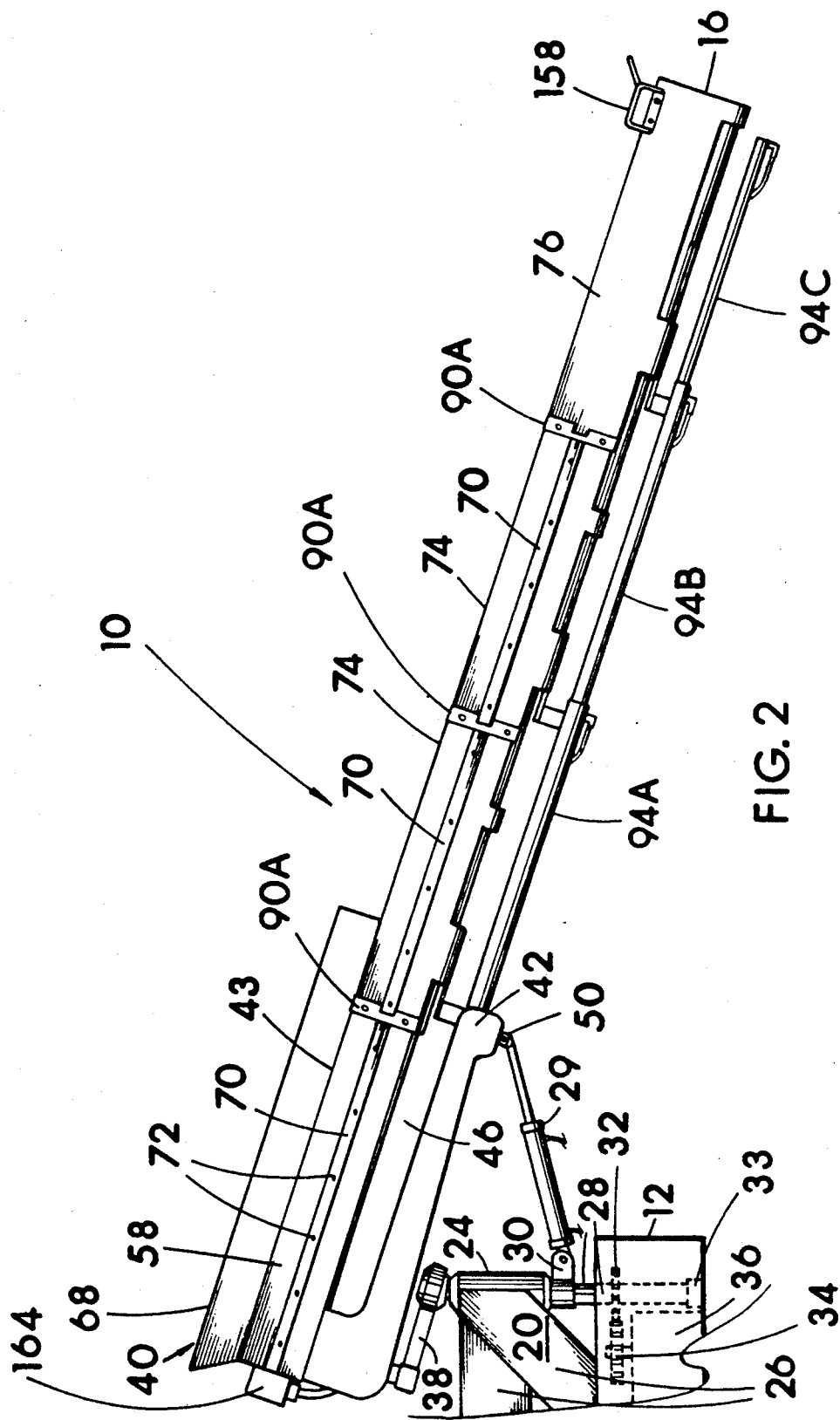
FIG. 2 is a side view of my telescopic chute in the extended position and enlarged from that shown in FIG. 1.
Figure 3:
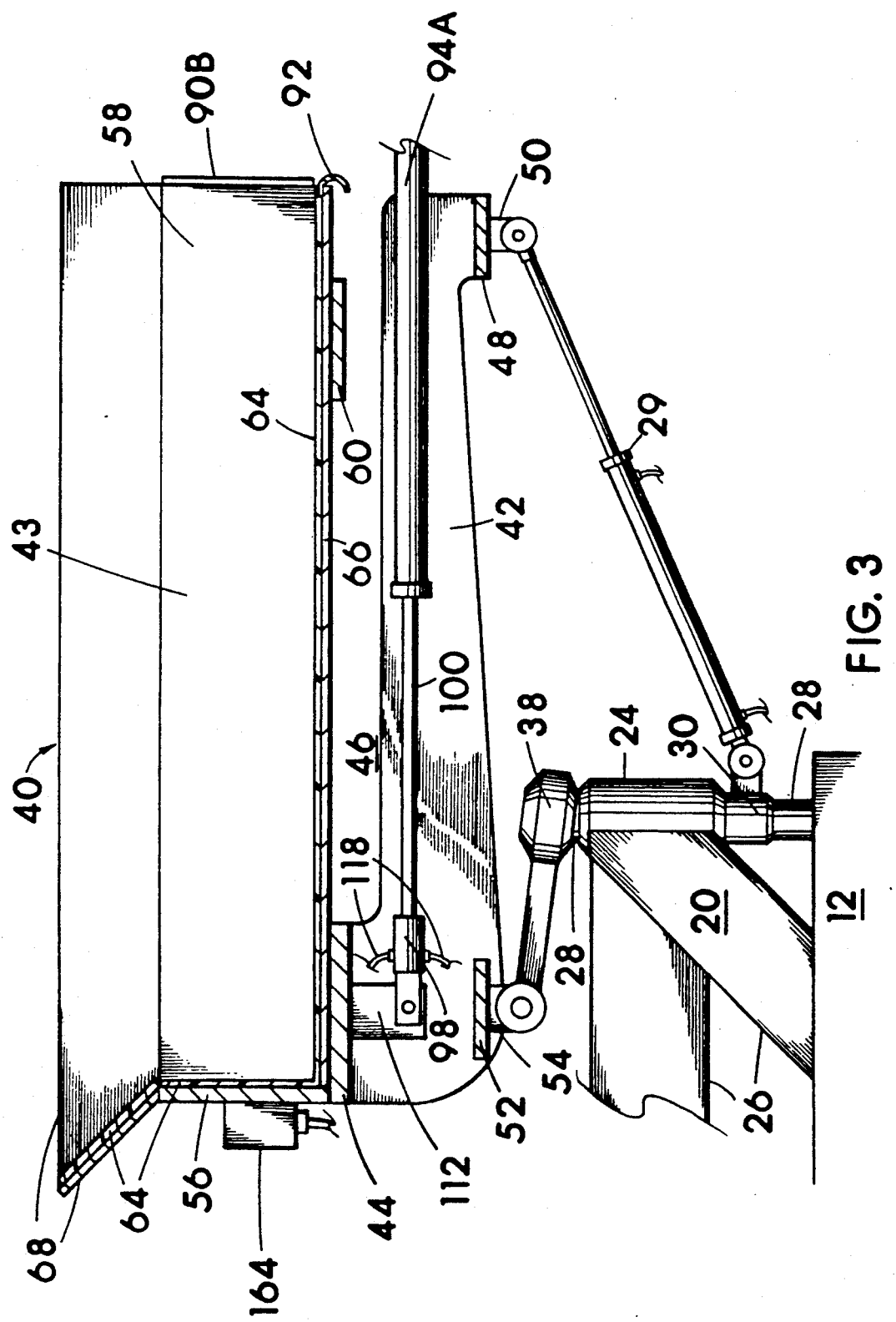
FIG. 3 is a cross-sectional view of the first chute section.

First chute section 40 shown best in FIG. 2 and 3, is the chute section positioned adjacent truck 12, and supports the remainder of the chute sections. First chute section 40 has two lower, spaced apart and parallel metal support arms 42, the left side support arm 42 is shown in FIG. 2 where it is hiding from view the right side support arm 42 shown in FIG. 3 and 5. FIG. 3 is a partial sectional view of first chute section 40. The rearward ends of support arms 42 positioned closest to truck 12, are each welded to the terminal edges of a horizontally positioned steel plate 44. Plate 44 is slightly wider than the remainder of trough portion 43, and in FIG. 5, although plate 44 is not shown, one can ascertain the approximate width of plate 44 since support arms 42 are shown outward of trough portion 43. Support arms 42 extend downward from the attachments to plate 44, and then extend forward below the trough portion 43 of first chute section 40 as shown in FIG. 2 and 3. An elongated open space 46 is provided between the two support arms 42, and between the bottom edge of the trough portion 43 and the upper edge of each support arm 42. Space 46 provides space for the nested storage of the remaining chute sections, and additionally provides space for hydraulic push cylinders or rams 94 positioned below the chute sections and used to power inward and outward movement of the chute sections relative to each other, the hydraulic rams 94 to be further explained later in detail. The forward ends of support arms 42 are tied together with a transverse steel plate 48 shown in FIG. 3 and 5. Plate 48 has a yoke 50 welded centrally thereto, and the slidable cylinder rod portion of push cylinder 29 is pivotally attached with a pin to yoke 50. The rearward ends of support arms 42 are additionally tied together with a steel plate 52 positioned below plate 44 and spanning between the two members 42. Plate 52 has a yoke 54 welded centrally thereto, and the one end of support arm 38 is pivotally attached with a pin or rod to yoke 54. When push cylinder 29 is extended, first chute section 40 is pivoted upward about a horizontal axis at the pivotal connection between yoke 54 and support arm 38, and when push cylinder 29 is retracted, first chute section 40 is pivoted downward at an angle. Support arms 42 primarily serve to allow the attachment of one end of push cylinder 29 further outward away from the pivotal connection between first chute section 40 and support arm 38, and this being to allow the use of a less powerful and costly push cylinder 29, and to provide increased stability in first chute section 40.

Trough portion 43 of first chute section 40 is the portion which receives the cement 11 from the drum 22 of truck 12, and is further comprised of a vertically positioned rear end plate 56 shown cross sectioned in FIG. 3. Plate 56 is preferably a thick steel plate for strength, and it spans across the back end of the chute section so as to prevent the escape and the flowing of the cement in the wrong direction in the chute. Vertical plate 56 is welded to horizontal plate 44. Welded to both horizontal plate 44 and vertical plate 56 are two elongated spaced apart and parallel vertical chute sidewalls 58, which are each made of relatively heavy rectangular steel plate. Toward the forward end of sidewalls 58, that is the end oppositely disposed from plate 56, is a transverse bottom plate 60 of steel welded to the bottom edge of each sidewall 58 and spanning therebetween. Plate 60 may be downwardly arcuate in shape.

The open framework formed by the welding together of plates 44, 56, 60, and sidewalls 58 provides a substantially rigid and strong open bottom and open top framework with the forward end completely open, and is for supporting the remainder of the chute sections. The described trough portion 43 of first chute section 40 so far leaves an open bottom which must be closed in order to direct cement, and there are a number of ways in which this may be suitably accomplished. One method would be to simply close the bottom with additional heavy steel plating similar to that used for plates 56, 60 and sidewalls 58, however, heavy steel plating is expensive when compared to thinner sheet metal for price. Another suitable way to close the bottom would be to line at least the bottom interior of the trough portion 43 with relatively thin sheet metal 66. The sheet metal 66 could be welded in place or attached removably with threadably engaged fasteners such as bolts for easy replacement. After affixing sheet metal 66 into trough portion 43, the metal interior of trough portion 43 should be coated with a polymeric or plastic coating, preferably of polyurethane which is designated by the number 64. One of the easiest ways of coating the metal is to use an available liquid polyurethane which may be spray applied with a spray gun or applied by brush, and which cures in air. Polyurethane 64 is very durable, relatively inexpensive, and cement is easily cleaned from the plastic. The interior of trough 43 can be easily periodically re-sprayed with polyurethane 64 or lined with any other suitable plastic using any suitable method as needed, however, due to the durability of polyurethane 64, the re-applying will not be necessary very often even with heavy use.

Figure 5:
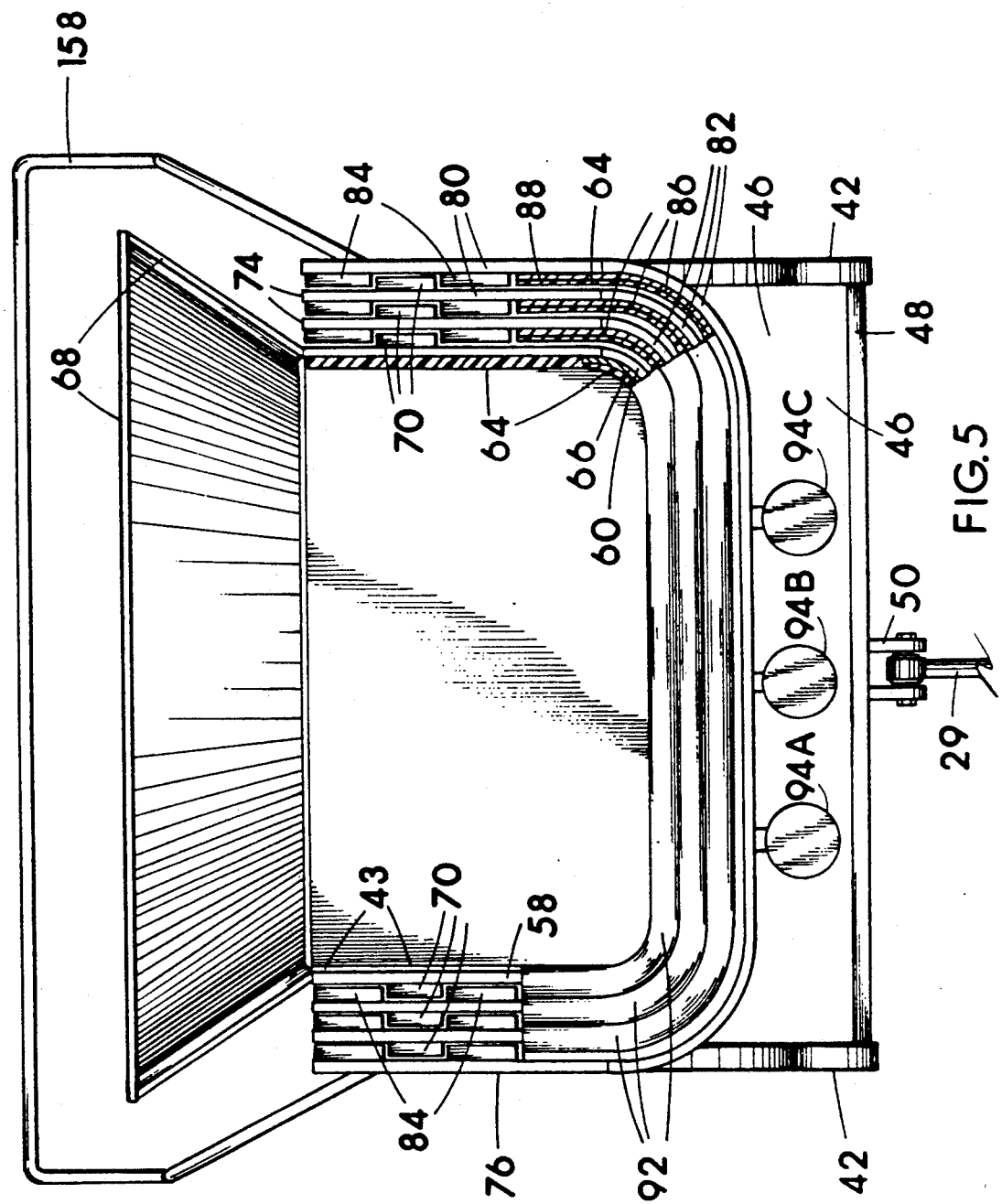
FIG. 5 is a view of the dispensing end of my assembled telescopic chute with the chute sections in the fully nested or retracted position.

As shown in FIG. 2, 3, and 5, a funnel like structure, designated funnel 68 is welded to the upper edges of sidewalls 58 and vertical plate 56. Funnel 68 is formed of a single shaped metal panel or plurality of attached panels which extend angling upward and outward from sidewalls 58 and vertical plate 56. Funnel 68 should also be covered with plastic such as polyurethane 64 as shown best in FIG. 3. Funnel 68 serves the purpose of widening and raising the height of trough portion 43 in order to help direct cement which flows rather quickly from the drum 22 of truck 12 into trough portion 43 wherein the cement at first may pile-up prior to naturally leveling out as it begin to flow through the open forward end of trough portion 43 and through the remainder of chute 10.

On the exterior surface of each sidewall 58 is a support rail 70 shown best in FIG. 2 where the right side support rail 70 is shown, and the left side support rail is shown in an end view in FIG. 5. Support rails 70 are rectangular bar stock, preferably steel, positioned to extend from one end of sidewall 58 adjacent plate 56 to the oppositely disposed end of sidewall 58. Support rails are preferably removably affixed in place with a plurality of threadably engaged fasteners such screws or bolts 72 for convenience of replacement when the rails 70 become overly worn after extended use. Support rails 70 will be further understood with an understanding of the structure of the remainder of the chute sections attached to trough portion 43 of first chute section 40.

The additional chute sections include one or more middle chute sections 74, and one end chute section 76 which is structured generally the same as chute sections 74. The number of middle chute sections 74 can vary as this does not directly effect the operation of telescopic chute 10, and in FIG. 1 and 2, two middle chute sections 74 are shown being used. The structure of each chute section 74 shown best in the exploded view of FIG. 4, and which is generally the same for end chute section 76, is comprised of an elongated open chute frame 78. Chute frame 78 is comprised of two spaced apart and parallel sidewalls 80. Sidewalls 80 are rectangular flat steel panels positioned on edge and affixed together with two arcuate transverse plates 82 of steel spanning between the bottom edges of sidewalls 80. Chute frames 78 may all be of a generally equal length to each other, but are sized, particularly in width to fit one chute frame 78 within another in a generally fully nested or nestable arrangement. Each chute frame 78 is structured progressively wider than the adjacent frame 78 the further from truck 12, with the largest chute frame 78 being the frame for end chute section 76. Trough portion 43 is the narrowest of the chute sections. Additionally, the wider the chute section, the further downward the arcuate transverse plates 82 extend to provide clearance for the transverse plates 82 of the adjacent more narrow chute sections as may be ascertained from FIG. 7.

The attachment structure for movably affixing one chute frame 78 within another chute frame 78, and the movable attachment of the assemblage of the plurality of affixed together chute frames 78 to trough portion 43 involves the attachment, preferably removably with bolts, of support rails 70 to the exterior of each sidewall 80 substantially as described for trough portion 43 above. End chute section 76 does not receive rails 70 since it is the outermost chute section, and does not support additional chute sections. Removably attached by bolts or other suitable fasteners to each interior surface of sidewall 80, is a pair of narrow elongated metal bars, designated guide rails 84, and also simply rectangular bar stock as is the case for rails 70. Each guide rail 84 of a pair of rails 84 is affixed parallel to the other rail 84 of the pair to form a space therebetween for tightly but slidably housing a single support rail 70 of an adjacent and narrower chute section. Trough portion 43 does not receive guide rails 84 in its interior, being the narrowest chute, but end chute section 76 does receive rails 84 so it may be supported by the adjacent middle chute section 74. An improved understanding of the positioning of support rails 70 and guide rail 84 may be gained from examining FIG. 5.

The interior bottom of each open chute frame 78 is affixed with a removable chute liner 86. Chute liner 86 in this example of the invention is made of relatively thin sheet metal 88 which has been rolled upward on each outer longitudinal side edge to fit within chute frame 78 closing the bottom thereof and covering the lower interior portion of each sidewall 80 as may be ascertained from FIG. 4. Each chute liner 86 is also coated with plastic such as polyurethane 64 at least on the surface of the liner 86 which is to come into contact with cement 11 flowing through chute 10. It should be noted liners 86 could be made entirely of properly shaped plastic. Each chute liner 86 is affixed within a chute frame 78 with the use of threadably engaged fasteners such as bolts 72 threaded into threaded holes in sidewalls 80. The bottoms of liners 86 rest on top of arcuate transverse plates 82 for support. As shown in FIG. 5, chute liners 86 extend upward at the sides thereof to about the bottom edge of the lower guide rail 84, which is slightly above the level which cement flowing through chute 10 levels out to as it flows from trough portion 43. Normally, liners 86 are generally the only portion of each chute section 74 and 76 which the cement flows against and thereby the relatively heavy and expensive chute frames 78 are saved from the abrasion of the flowing cement, and should never need replacement or repair. As one may ascertain from FIG. 5, the size differentials of the chute frames 78 and the spacing maintained therebetween by rails 70 and 84 provide sufficient space for liners 86 to be bolted to sidewalls 80, and have the chute frames 78 telescopically fitted together, one within the other, and one over the other, with the weight of each frame 78 supported by the connection of rails 70 and 84, and further with this connection being one which would allow the chute sections to slide inward and outward relative to each other and relative to trough portion 43 of first chute section 40 along a longitudinal axis to allow shortening and lengthening of telescopic chute 10.

Figure 4:
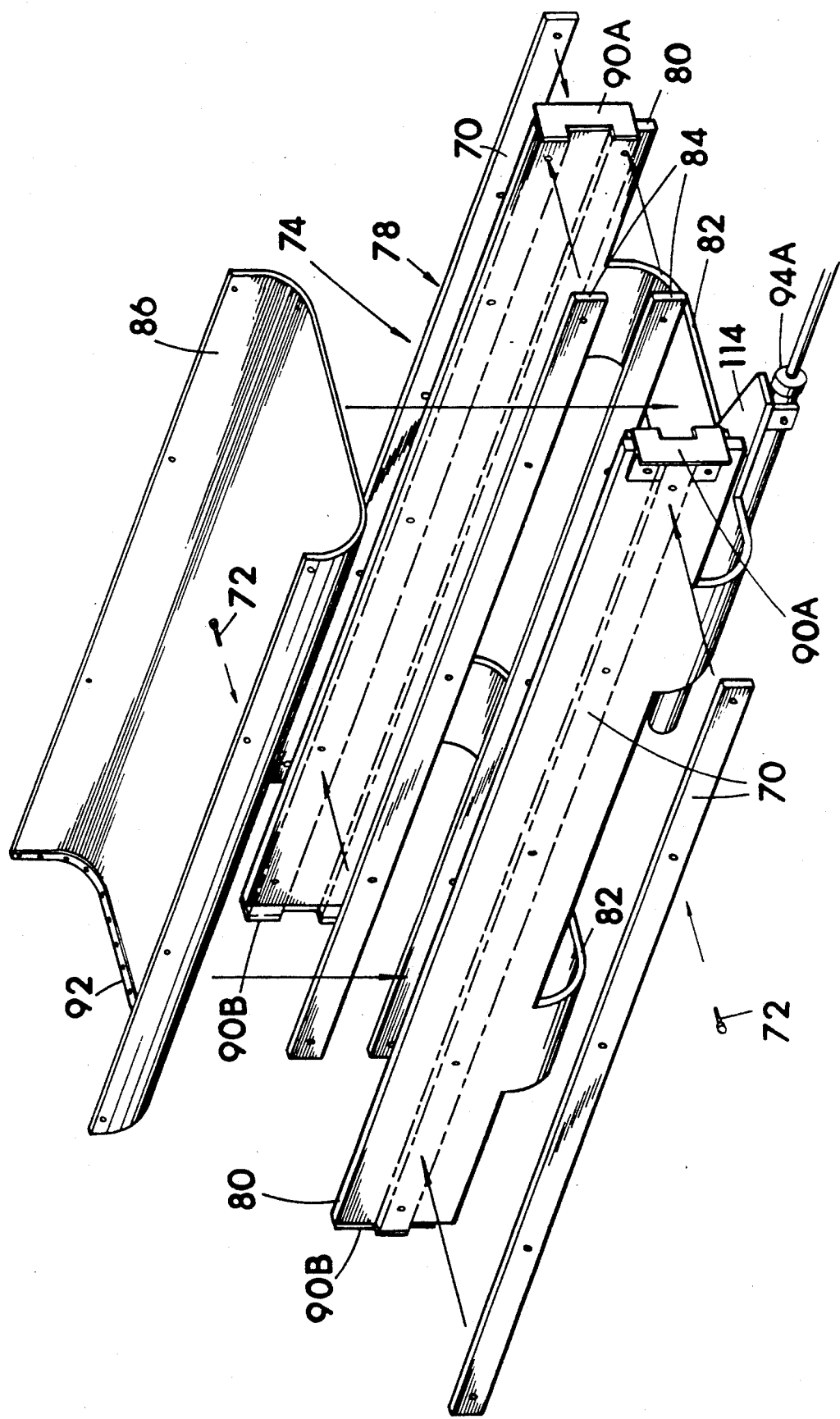
FIG. 4 is an exploded view of one of the middle chute sections, and is also generally representative of the end chute section of my telescopic chute.

Additionally attached to each sidewall 80 at one end thereof, are flexible yet rather stiff rubber or plastic outside scrappers 90 A shown best in FIG. 2 and 4. Outside Scrappers 90 A are shaped and positioned to wipe away abrasive material which may be resting on top or stuck to the sides or bottom of rails 70 during retraction of the chute sections, this being to prevent binding of the sliding connections between rails 70 and 84, and to reduce wear of the rails. Scrappers 90 A should be removably attached to sidewalls 80 with threadably engaged fasteners such as bolts for simple replacement when the scrappers 90 A become overly worn. Trough portion 43 does not receive scrappers 90 A because it is the narrowest chute section. Middle chute sections 74, and end chute section 76 each receive two scrappers 90 A, one on each sidewall 80, on the end of the chute section which faces toward first chute section 40 so rails 70 of the adjacent and narrower chute section may be wiped clean just prior to entering further into the space between rails 84 of the chute section supporting the scrappers 90 A during retraction of chute 10. On the oppositely disposed ends from scrapper 90 A of sidewalls 80, and on the forward end of sidewalls 58 of trough portion 43 of first chute section 40 are inside scrappers 90 B. Inside scrappers 90 B are made of a rather stiff yet somewhat flexible rubber or plastic material removably bolted in place to the end of a chute sidewall. Scrappers 90 B are shaped and positioned to wipe clean the space between rails 84 adjacent rails 70 during retraction and extension of chute 10. Scrappers 90 A and 90 B are not shown in FIG. 5 to allow for showing the relationship of rails 70 and 84.

Attached to one end of each chute section 74, the end which supports scrappers 90 B, is a liner scrapper 92. Scrappers 92 are most conveniently attached to liners 86 on chute section 74. Trough portion 43 also receives a liner scrapper 92 on its forward open end affixed to sheet metal 66. End chute section 76 does not receive a liner scrapper 92 since it is the outermost and lowermost chute section. Liner scrappers 92 are attached to the end of each chute section which is positioned closest toward the dispensing end 16 of chute 10. Liner scrappers 92 are made of flexible and resilient, yet rather stiff rubber or plastic material sized and positioned across the full width of liners 86 in affixment to hang downward from the chute section supporting the scrapper 92, and press tightly against the interior or exposed upper surface of the liner 86 of the adjacent larger chute section. Liner scrappers 92 are removably attached with threadably engaged fasteners such as bolts or other suitable attachment methods to provide for simple replacement when overly worn. The purpose for liner scrappers 92 is to wipe clean the adjacent liner 86 of the adjacent and lower chute section. As the chute sections are drawn into a fully nested or retracted chute position, scrappers 92 prevent rocks in cements from working between the bottom surface and the top surface of two over lapping chute liners 86, and assist in pushing cement out the dispensing end 16 of chute 10. Scrappers 92 essentially remove all of the large pieces of material within chute 10 during retraction, and after chute 10 has been retracted, the chute may then be extended and the remaining fine residue of cement may be easily removed from the extended chute 10 by rinsing with water. Line scrappers 92 are shown in FIG. 5, where a portion of the scrappers 92 has been deleted from the drawing so as to be able to illustrate in cross section a portion of chute liners 86.

Figure 6:
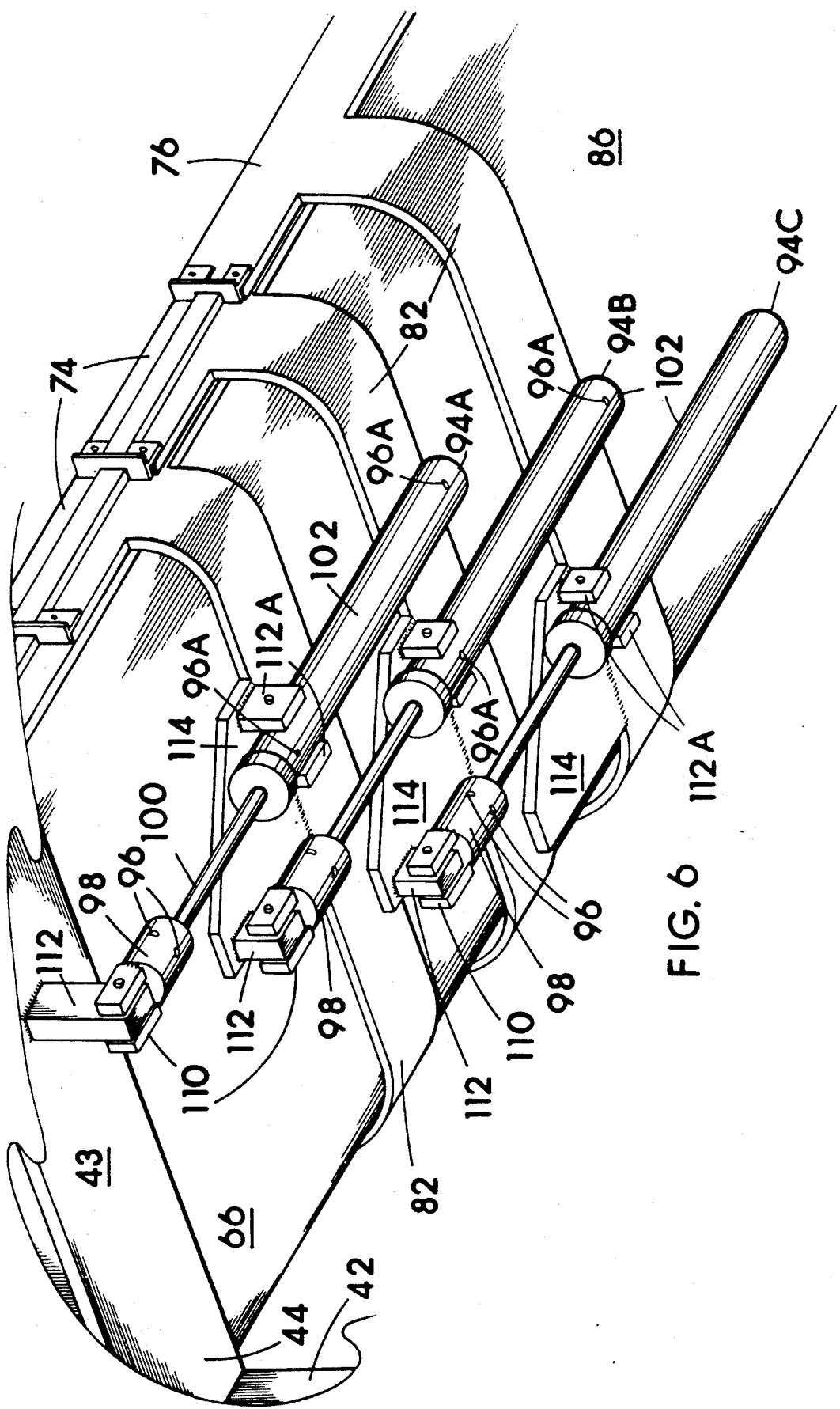
FIG. 6 is a partial view of the underside of my telescopic chute showing an attached plurality of modified hydraulic rams which are partially extended.
Figure 7:
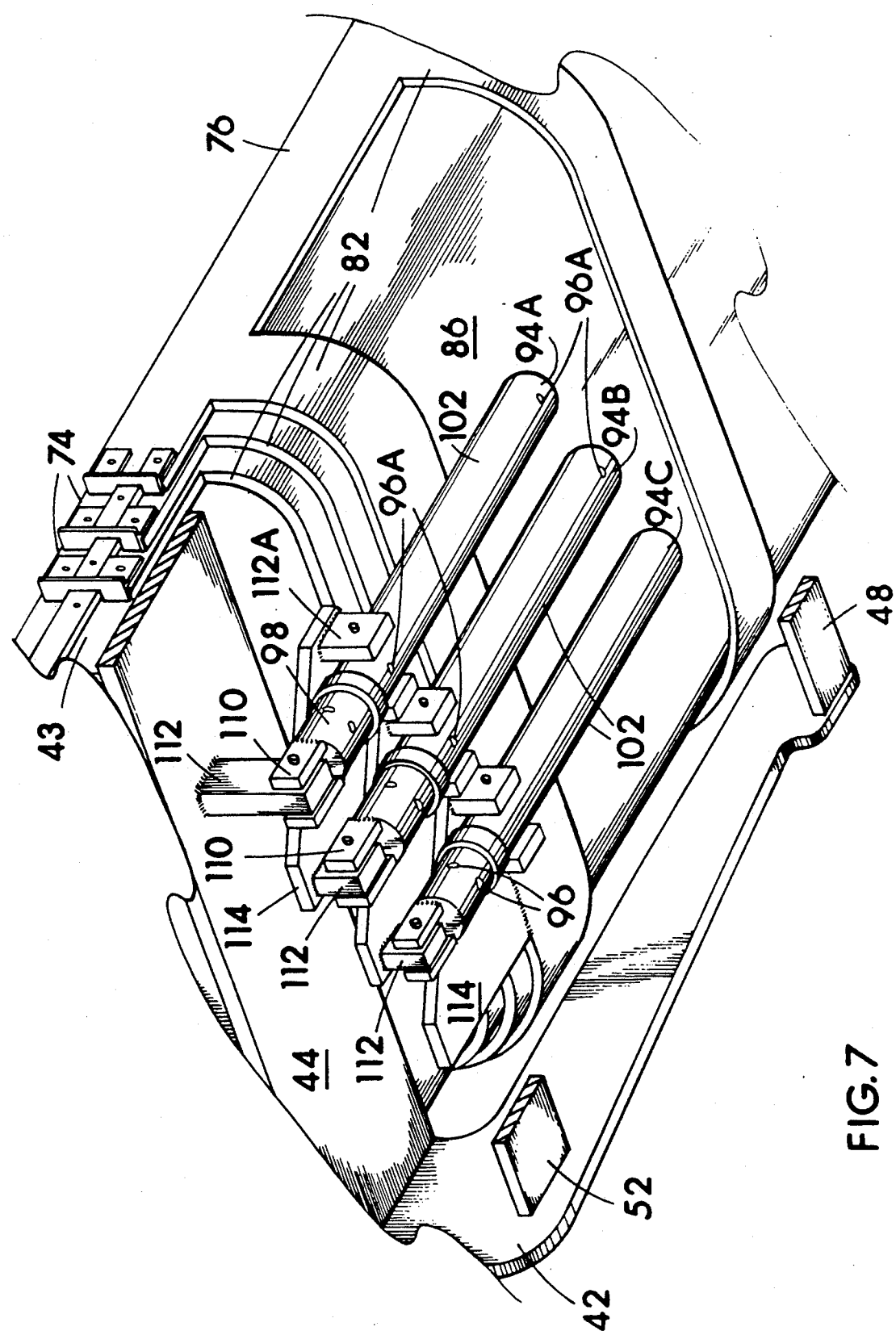
FIG. 7 is a partial view of the underside of my telescopic chute showing an attached plurality of modified hydraulic rams in a retracted position.
Figure 8:
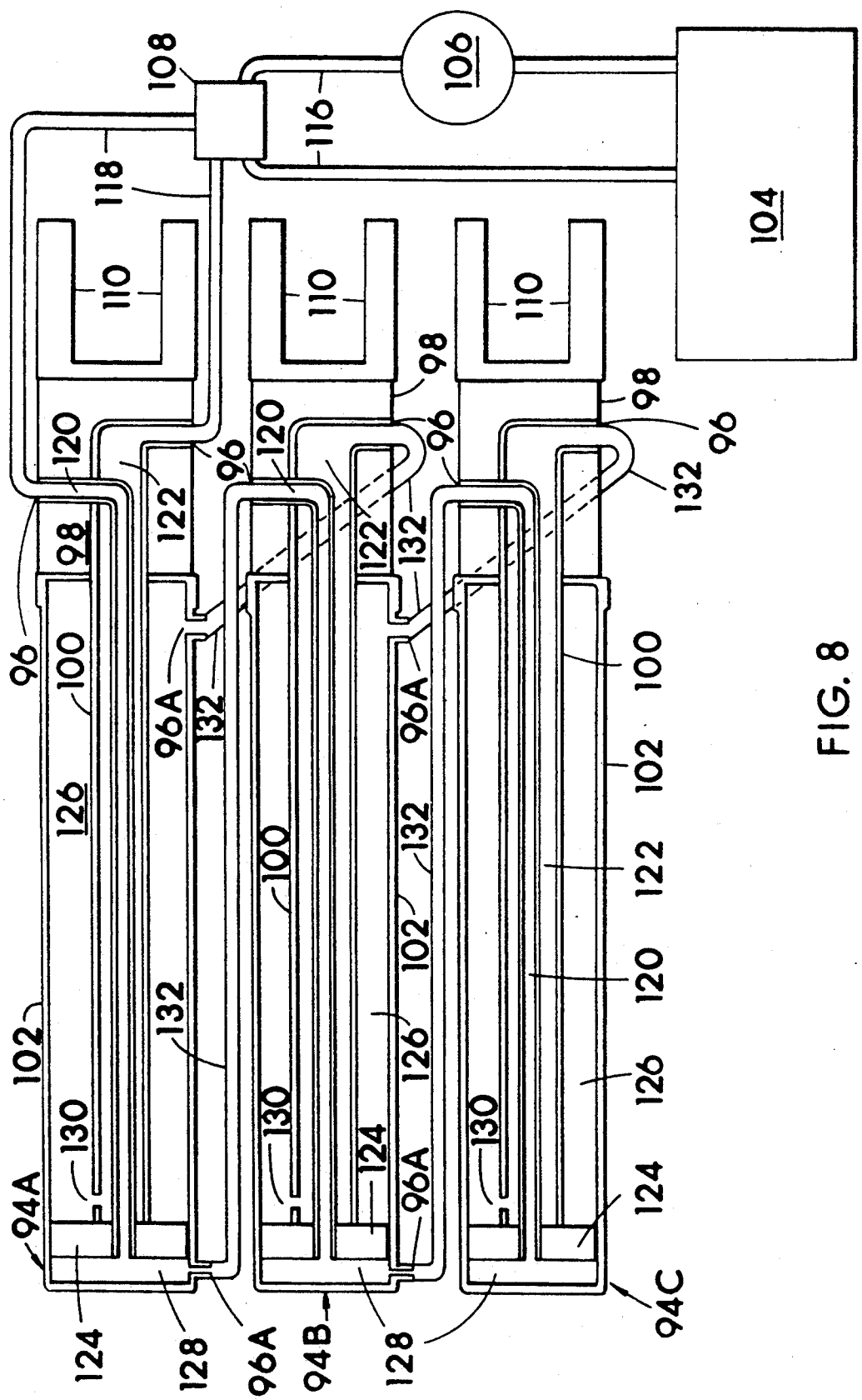
FIG. 8 is a diagrammatic illustration of the modified hydraulic rams of FIG. 6 and 7, and the fluid feed tubing therefor, which may be use as part of the immediate invention to eliminate long flexible hydraulic hoses.

A description of powering equipment to cause the movement of the chute sections 74 and 76 inward and outward relative to each other, and relative to trough portion 43 of first chute section 40 along a longitudinal axis will not be given with reference primarily to drawing FIGS. 6, 7 and 8, although drawing FIGS. 2, 3, and 5 may assist in helping to understand my most preferred powering means for relative inward and outward movement of the chute sections 40, 74, 76.

FIG. 6 is a partial view of the underside of telescopic chute 10 showing three modified hydraulic rams 94 attached to the chute sections 40, 74, 76 of chute 10. Hydraulic rams 94 are shown partially extended, and the chute sections have been moved partially outward from a fully nested or retracted position to a partially extended position. The chute sections at least partially shown include two middle chute sections 74, the one end chute section 76, and part of trough portion 43 of chute section 40 inclusive of the bottom of plate 44. Each ram 94 is further designated with an A, B, or C in addition to the 94 for clarity of further descriptions of the rams to be given. FIG. 7 is a partial view of the underside of my telescopic chute 10 showing hydraulic rams 94 essentially the same as in FIG. 6, only with rams 94 and the chute sections fully retracted or nested.

A ram 94 is used for each movable chute section, for example in FIG. 6 there are three rams 94, one for each slidably retained chute section 74 and one for the slidably retained end chute section 76. Each ram 94 is a linear extendable double-acting hydraulic ram capable of pushing out with power and retracting with power, and are specifically structured in a manner to eliminate the problem of long flexible hydraulic hoses. Each ram 94 appears substantially the same as conventionally structured double-acting rams which are widely available, and which normally have the fluid input and output ports on oppositely disposed ends of the cylinder rod housing only. In FIG. 6 and 7, the hydraulic lines or conduits used for supplying hydraulic fluid under pressure to each of the rams 94 have not been included in the drawings for the sake of clarity of the shown structures.

Rams 94 include fluid ports 96 in the heads 98 for in putting and out putting hydraulic fluid into the rams 94. Rams 94 A and B also include fluid ports 96 A in the two oppositely disposed ends of each the cylinder rod housings 102 which allows for the use of rigid fluid lines for feeding fluid to the adjacent ram 94. Ram 94 C is in essence the last ram 94, and ports 96 A are therefor not needed in ram 94 C as will be better understood with continued reading.

Heads 98 of each ram 94 include affixed yokes 110 to allow the attachment of the head 98 ends of rams 94 to single posts 112 as shown in FIG. 6 and 7. Posts 112 for end chute section 76, and for each middle chute section 74 are each affixed to the bottom surface of triangular plates 114, one plate 114 welded to the transverse plate 82 of the respective chute section which is positioned closest toward first chute section 40. Plates 114 are staggered in height due to the height staggering of transverse plates 82, and posts 112 and rams 94 are attached to plates 114 in a sideways off-set manner relative to one another so plates 114 may to pulled toward one another so as to reside one plate 114 generally over the other as shown in FIG. 6 to allow a more complete full nesting of the chute sections 40, 74, 76.

The yoke 110 of ram 94 A is attached to a post 112 which is welded to the underside of plate 44 of trough portion 43 of first chute section 40. The cylinder rod housing 102 of ram 94 A is attached to plate 114 with twin posts 112 A of the nearest middle chute section 74, so that if first ram 94 A extends or retracts, it moves the adjacent chute section 74 relative to first chute section 40 and trough portion 43. The yoke 110 of ram 94 B is attached to a post 112 which is welded to the same plate 114 to which the cylinder rod housing 102 of ram 94 A is attached, and the cylinder rod housing 102 of ram 94 B is attached to plate 114 with twin posts 112 A of the nearest adjacent middle chute section 74 toward dispensing end 16 of chute 10. Since one end of ram 94 B is connected to one chute section 74, and the other end of ram 94 B is attached to another adjacent chute section 74, when ram 94 B either extends or retracts, the adjacent chute sections 74 move inward or outward relative to each other.

The yoke 110 of the third ram 94 C is attached to a post 112 which is welded to the same plate 114 to which the cylinder rod housing 102 of ram 94 B is attached, and the cylinder rod housing 102 of ram 94 C to attached with twin posts 112 A to plate 114 of end chute section 76. Since one end of ram 94 C is connected to one chute section 74, and the other end of ram 94 C is attached to the adjacent end chute section 76, when ram 94 C either extends or retracts, the two adjacent chute sections 74 and 76 move inward or outward relative to each other.

It should be carefully noted that cylinder rod housing 102 of ram 94 A is affixed stationary at all time relative to head 98 of ram 94 B, and that cylinder rod housing 102 of ram 94 B is affixed stationary at all time relative to head 98 of ram 94 C, and it is these stationary relationships which allow the use of rigid conduits 132, and the elimination of long flexible hydraulic hoses to feed rams 94 as one will better understand with reference to FIG. 8.

In FIG. 8, rams 94 A, B, and C are diagrammatically illustrated as part of a complete hydraulic system which generally depicts the arrangement used on chute 10. Hydraulic fluid reservoir 104 and hydraulic fluid pump 106 are normally standard equipment attached to truck 12 at the truck building factory for powering standard equipment such as rotation of drum 22. Hydraulic fluid pump 106 is powered by the engine of truck 12, often by way of power-take-off shafting. Hydraulic control valve 108 is a conventional four-port fluid flow reversing valve, which are available for manually or solenoidal control.

Hydraulic fluid lines shown in FIG. 8 include lines 116 which are the output and return fluid conduits from pump 106 and reservoir 104 to control valve 108. Lines 118 are the fluid conduits from control valve 108 to head 98 of ram 94 A, and are either fluid output or fluid return lines dependant of the positioning or mode of control valve 108 so as to always provide a fluid circulatory system. Lines 118 should be flexible hoses to allow chute 10 to swing left and right relative to truck 12, and can be kept short due to the stationary affixment of head 98 of ram 94 A onto plate 44. Lines 118 attach to and communicate fluid with ram 94 A at ports 96 in head 98. The cylinder rods 100 of all of the rams 94 are hollow tubes having two separate fluid conduits therein. Each cylinder rod 100 is structured of a larger outer tube 122 with a smaller tube 120 within the larger outer tube 122. One end of the outer tube 122 is affixed within head 98 and is in communication with one of the ports 96 so as to be in communication with hydraulic fluid within one of the lines 118. The smaller tube 120 exits through the sidewall of outer tube 122 within head 98, and is in communication with the other port 96 so as to be in communication with hydraulic fluid within the other line 118. Cylinder rods 100 of all ram 94 are slidable relative to housings 102. The terminal ends of cylinder rods 100 have affixed pistons 124. Pistons 124 are slidable relative to housings 102, and are structured to seal against the interior sidewalls of the housings 102 in order to divide the housings 102 into two fluid chambers, designated chambers 126 and chambers 128. The larger tubes 122 of each ram 94 each have an opening 130 adjacent pistons 124 into chambers 126. The smaller tubes 120 each pass centrally through the pistons 124 and communicate with chambers 128. Housings 102 of rams 94 A and 94 B each have two ports 96 A, one port 96 A being in communication with chamber 128, and one port 96 A being in communication with chamber 126. Two rigid fluid conduits 132 connect between the ports 96 A of ram 94 A and the ports 96 of ram 94 B so as to bring chamber 128 of ram 94 A into communication with chamber 128 of ram 94 B, and to bring chamber 126 of ram 94 A into communication with chamber 126 of ram 94 B. Two rigid fluid conduits 132 connect between the ports 96 A of ram 94 B and the ports 96 of ram 94 C so as to bring chamber 128 of ram 94 B into communication with chamber 128 of ram 94 C, and to bring chamber 126 of ram 94 B into communication with chamber 126 of ram 94 C. If there was an additional chute section toward dispensing end 16 of chute 10, then ram 94 C would need ports 96 A in order to communicate fluid into the additional ram head 98 which would be needed to power the additional chute section.

In FIG. 8, the rams 94 are shown in the fully retracted position, which is the chute sections being retracted together. Assuming all air has been purged from within all the lines 118, 132, cylinder rods 100, and chambers of rams 94 with hydraulic fluid, in order to extend the rams 94, hydraulic fluid under pressure would be forced by pump 106, through control valve 108, through one of the lines 118 dependant on the positioning of the internal valve within control valve 108, and then into smaller tube 120 of ram 94 A, through the center of piston 124 and into chamber 128 of ram 94 A. The fluid would essentially flow through port 96 A of the chamber 128, through a conduit 132 and into a port 96 of ram 94 B. The fluid would then flow through smaller tube 120 and into chamber 128 of ram 94 B. The fluid would then flow through port 96 A of chamber 128 of ram 94 B, and through a conduit 132 which leads to a port 96, smaller tube 120 and into chamber 128 of ram 94 C. Once all chambers 128 are under pressure, all of the housings 102 will simultaneously begin to move outward away from heads 98. Chambers 128 will begin to expand, and chambers 126 will begin to reduce in size due to the changing relative positioning of pistons 124 within housings 102 as the housings 102 move outward, and move the chute sections 74 and 76 with them. As chambers 126 reduce in size, the fluid within chamber 126 of ram 94 C is forced through opening 130 into larger tube 122, through a conduit 132 and into chamber 126 of ram 94 B. The fluid from chamber 126 of ram 94 B is forced through opening 130 into larger tube 122, through a conduit 132 and into chamber 126 of ram 94 A. The fluid then travels from the shrinking chamber 126 of ram 94 A through opening 130 into larger tube 122, then into what is then the fluid return line 118 to control valve 108, and back into fluid reservoir 104 by way of the return line 116 which extends between control valve 108 and fluid reservoir 104. In order to retract rams 94, the fluid flow is essentially reversed by way of actuating control valve 108 into a reverse flow mode, and this should be understood by those skilled in the art. It should be noted, that although fluid conduits 132 have been described as being rigid tubing, they could be flexible hosing secured to housings 102, but in either situation, conduits 132 are kept short enough so as to eliminate long hanging hoses. Additionally, although rams 94 at first glance may appear to be somewhat complicated and possibly expensive to manufacture, they really are not, especially when compared to double-acting telescopic rams.

Figure 10:
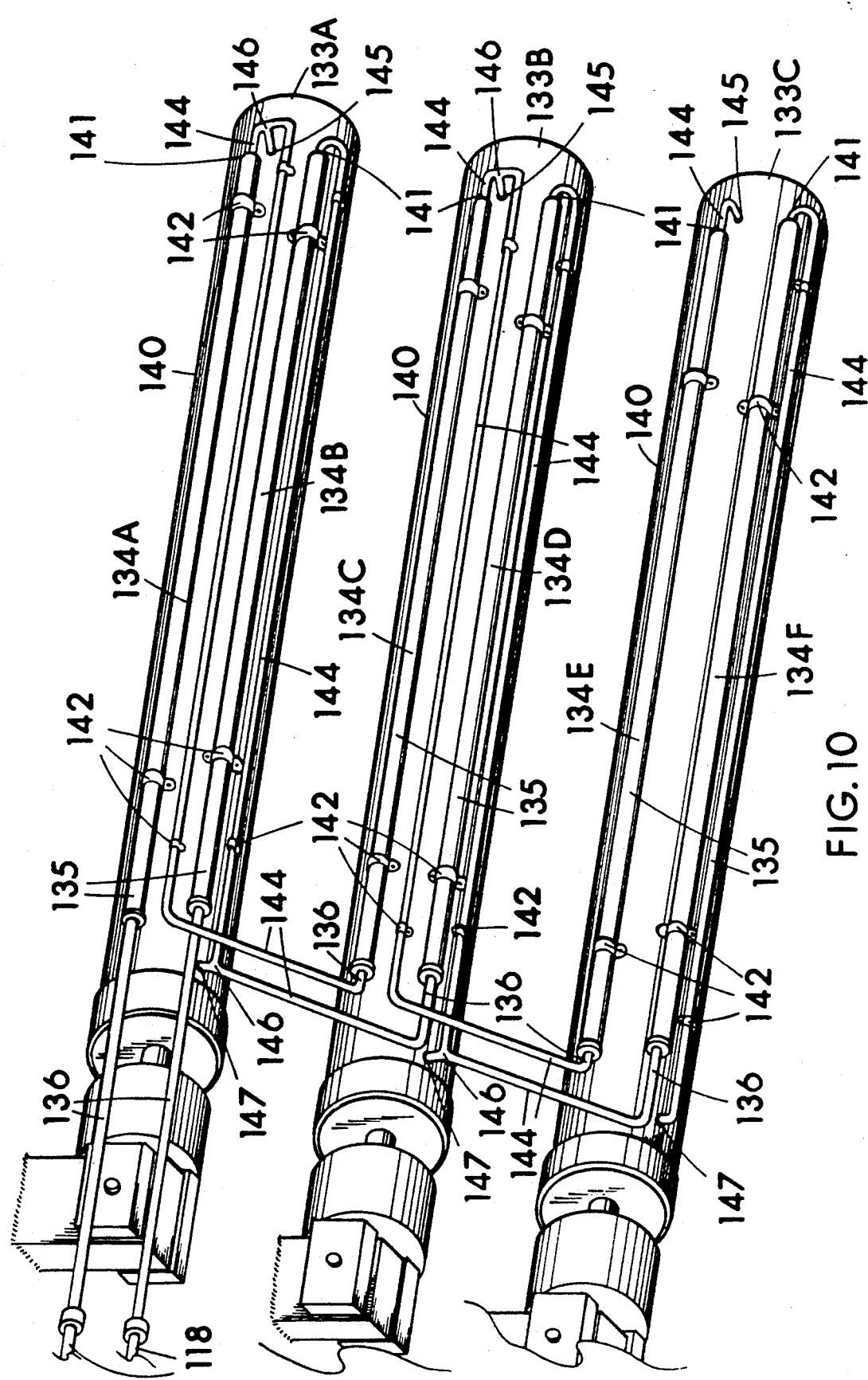
FIG. 10 illustrates three conventionally structured double-acting hydraulic rams connected using a plurality of the telescopic hydraulic lines made in accordance to that shown in FIG. 9.

Referring now mainly to FIG. 9 and 10 where suitable alternative structuring for extending and retracting chute 10 to that of rams 94 is shown, and which also eliminates the necessity of long hanging hoses. FIG. 10 shows three retracted conventionally structured double-acting hydraulic rams 133 which could be physically substituted for rams 94 on the chute sections of chute 10. Each of the rams 133 are further designated with an A, B, or C in addition to the 133 for clarity of further descriptions of the rams 133 with attached telescopic lines 134 to be given. The attachments of rams 133 to the chute sections 40, 74, 76 would be substantially the same as that for rams 94, using plate 44 of trough portion 43, plates 114, and posts 112 and 112 A. FIG. 9 illustrates in cross section, a rigid, linear extendable and retractable telescopic hydraulic line 134, which is usable as a substitute to long lengths of hosing dangling below chute 10 in order to reserve hose length for chute 10 to move into an extended position from a retracted position. A plurality of identical telescopic lines 134 would be used on chute 10, essentially two telescopic lines 134, one fluid supply, and one fluid return for each conventionally structured double-acting ram 133.

Each telescopic line 134 is comprised of a cylindrical hollow housing 135 which houses a slidable rigid fluid conduit 136. Fluid conduit 136 is supported at one end of housing 135 by stabilizing seals 137 within housing 135, which help maintain fluid conduit 136 parallel to housing 135, and also prevents leakage of hydraulic fluid in the area where conduit 136 exits an end of housing 135. An annular stabilizing collar 138 is affixed to a terminal end of conduit 136, adjacent an opened end of conduit 136 within housing 135. Collar 138 is slidable with conduit 136 within housing 135, and supports the terminal end of conduit 136. Collar 138 has apertures 139 therethrough to prevent the collar 138 from effectively dividing the interior of housing 135 into two chambers, this being to prevent any possibility of a pressure differential on the opposite sides of collar 138 and having the collar 138 act as a piston which would in essence allow telescopic line 134 to act as a push cylinder. Primarily due to apertures 139, telescopic line 134 does not have the capability of pushing or pulling as is the case with a push cylinder or ram, but instead is structured to allow the passage of hydraulic fluid through conduit 136 and out an oppositely disposed open end 141 of housing 135, or through open end 141 and out conduit 136. Open end 141 of housing 135 is shown in FIG. 9 with threads 143 as an example of one structure to allow the attachment of a fluid line or conduit thereto. Even when fluid under high pressure is flowing through a telescopic line 134, a person can grasp housing 135 in one hand, grasp conduit 136 in the other hand, and move conduit 136 inward and outward relative to housing 135 at will.

In FIG. 10, so as to grant the reader greater ease in understanding, each of the telescopic lines 134 are further designated with using A, B, C, D, E, and F. As shown in FIG. 10, the cylinder rod housing 140 of ram 133 A has the housings 135 of two telescopic lines 134 affixed stationary thereto with attachment straps 142. The conduits 136 extend from housings 135, essentially toward truck 12, and are connected to flexible fluid lines 118 which would be extending from control valve 108 as may be ascertained, with a correlation of concepts from FIG. 8. In FIG. 10, all rams 133 are retracted, and in this situation, the collars 138 of conduits 136 of all of the telescopic lines 134 are positioned adjacent open ends 141, or in other words, conduits 136 are pushed as far as possible into housings 135 in order to leave a substantial length of the conduits 136 which could be withdrawn from housings 135. The prior mentioned withdrawing of conduits 136 occurs with extension of the rams 133 which causes extension of chute 10 which will be better understood with continued reading.

All of the conduits 136 are straight for at least a length approximately equal to the length of the housings 135, and in the case of telescopic lines 134 A and B, for a substantially longer distance. In the case of telescopic line 134 C, the end of conduit 136 on the exterior of housing 135 is attached to additional rigid tubing 144 which is bent periodically as needed to extend across over to ram 133 A where the tubing 144 is then affixed stationary with some straps 142 to the housing 140 of ram 133 A. Tubing 144, which is essentially an extension of conduit 136, extends along housing 140 and enters open end 141 of telescopic line 134 A, an arrangement which allows fluid to flow from line 118, through telescopic line 134 A and into telescopic line 134 C. At fluid port 145 of ram 133 A, a tee fitting 146 or other suitable conduit arrangement is used to communicate fluid within tubing 144 into housing 140 of ram 133 A.

In the case of telescopic line 134 E, the end of conduit 136 on the exterior of housing 135 is attached to additional rigid tubing 144 which is bent periodically as needed to extend across over to ram 133 B where the tubing 144 is then affixed stationary with some straps 142 or other suitable means to the housing 140 of ram 133 B. Tubing 144, which is essentially an extension of conduit 136 of telescopic line 134 E, extends along housing 140 and enters open end 141 of telescopic line 134 C, an arrangement which allows fluid to flow from line 118, through telescopic lines 134 A and C and into telescopic line 134 E. Rigid line 144 extending between telescopic lines 134 C and E is tapped into with a tee fitting 146 to communicate fluid within the line 144 with fluid port 145 of ram 133 B. Open end 141 of telescopic line 134 E is connected to a short length of tubing, also designated 144, which extends to connect with fluid port 145 of ram 133 C. Fluid ports 145 of the three rams 133 are all located on one side of the internal piston of the rams 133. The line 118 connected to conduit 136 of telescopic line 134 B, additional rigid tubing 144 connecting to appropriate open ends 141 and conduits 136 of telescopic lines 134 B, D and F, and additional tee fittings 146 connected to appropriate fluid ports 147 are utilized to communicate hydraulic fluid to the opposite side of the internal piston of each of the rams 133. It should be carefully noted that, all conduits 136 must be left free floating or unattached to the housings 140 of the rams 133 to which the housing 135 of a given telescopic line 134 is attached, this being to allow the conduits 136 to move relative to the housings 135 in which they are retained.

In order to extend the rams 133 shown in FIG. 10, fluid is applied under pressure into the ports 145 at which time all of the rams 133 simultaneously begin to extend, which would also extend chute 10. During this extension mode, since the housings 140 of rams 133 are not affixed stationary relative to one another, and actually move relative to one another, all conduits 136 would be withdrawn somewhat from their respective housings 135, and this being due to the rigidity of conduits 144 and the stationary affixment of the conduits 144 to the housings 140 along which they extend and are attached to with straps 142. During this extension mode, ports 147 would be serving as fluid return ports. In order to retract rams 133 and chute 10 from an extended position, hydraulic fluid is applied under pressure into the ports 147 at which time all of the rams 133 simultaneously begin to retract. During this retraction mode, ports 145 would be serving as fluid return ports.

Figures 11, 12:
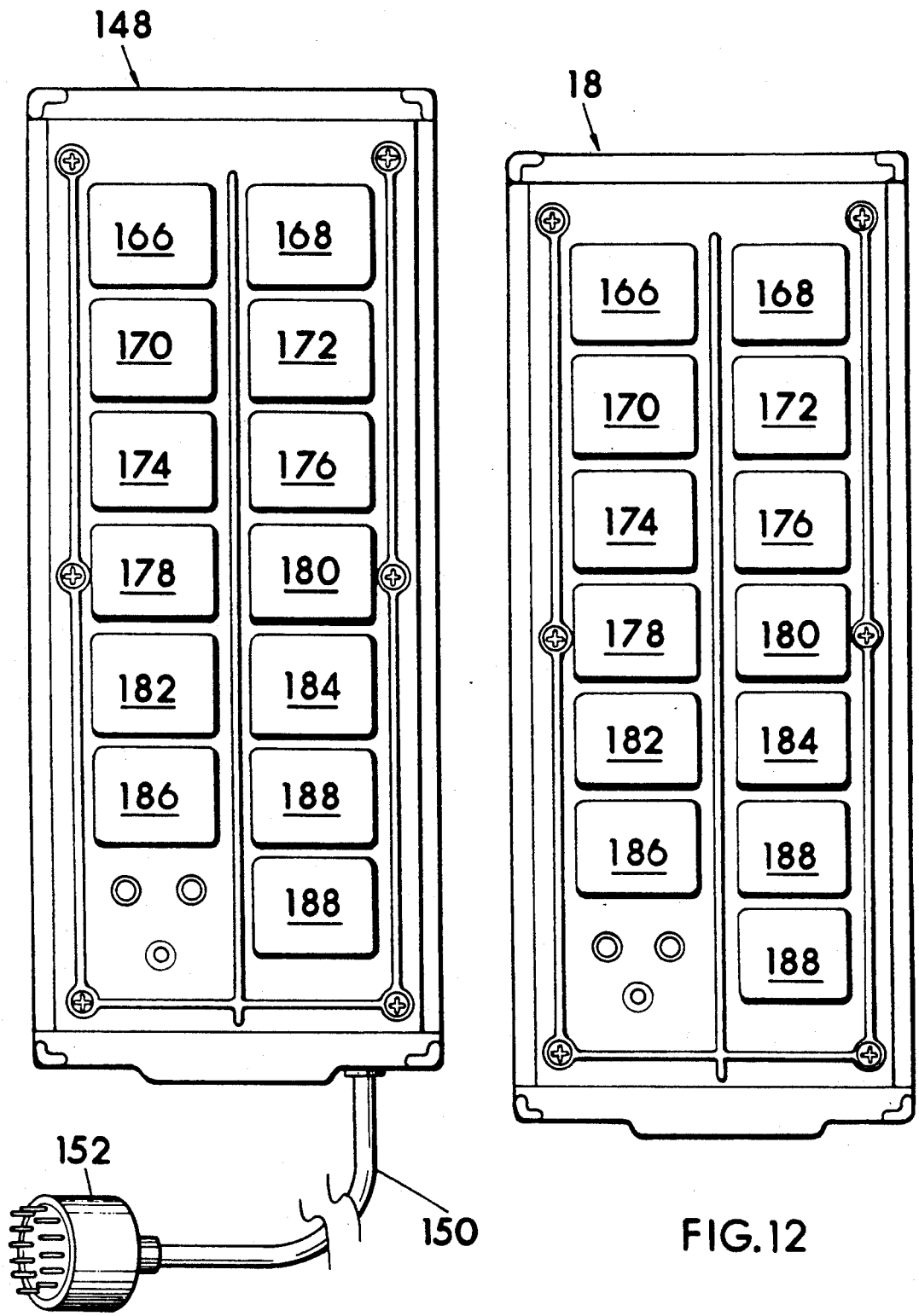
FIG. 11 is a cord-connectable hand-held remote switching unit which may be used to actuate solenoid controlled valves and control movement in the chute from adjacent the dispensing end.
FIG. 12 is a wire-less transmitting hand-held remote switching unit which may be used to actuate solenoid controlled valves and control movement in the chute from adjacent the dispensing end.
Figure 13:
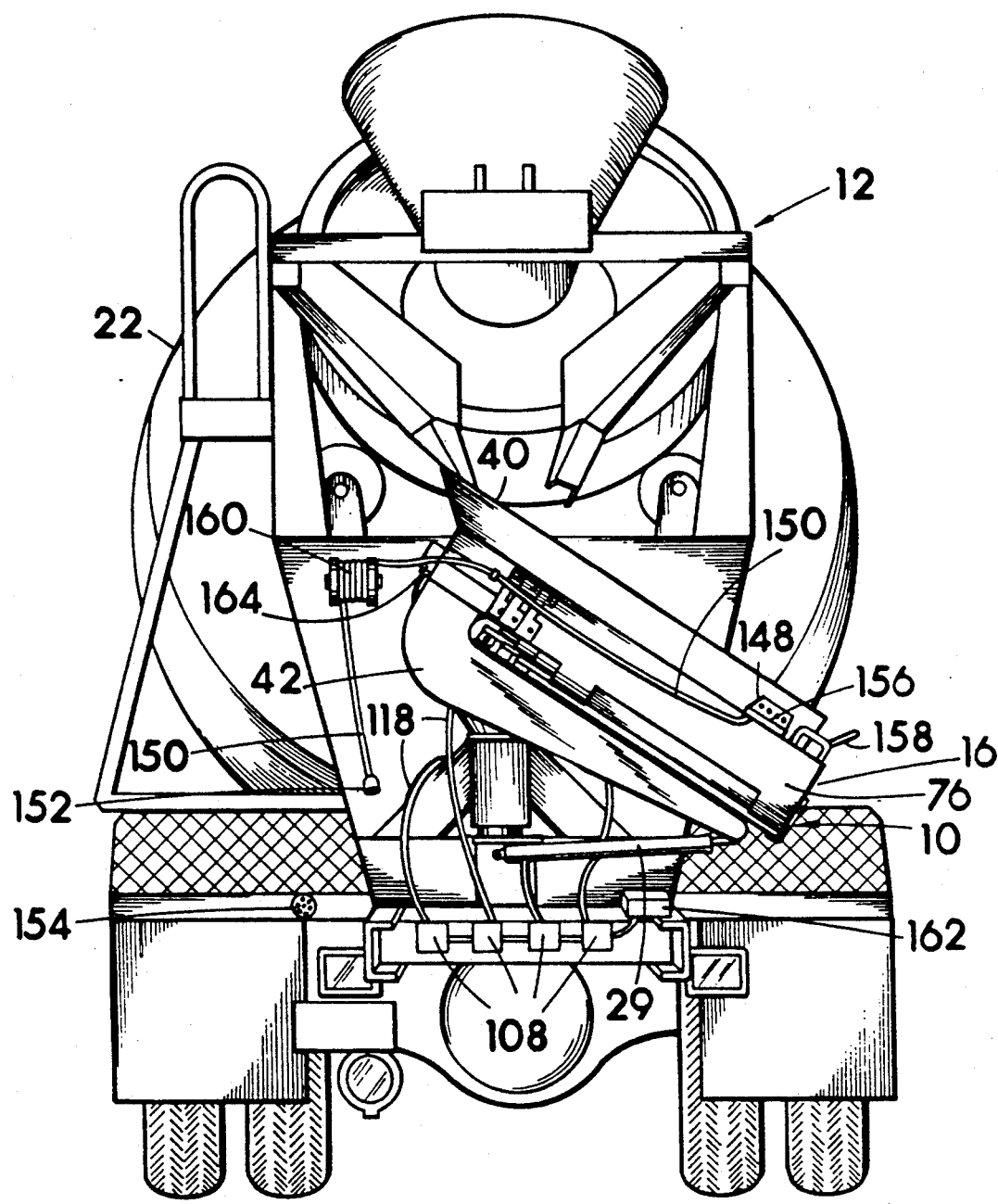
FIG. 13 is a view of the back end of a mixer truck with my telescopic chute attached and in the retracted or fully nested position.

Referring now mainly to FIG. 11, 12, and 13 for a description of how in and out, left and right, and up and down powered movement of chute 10 is best controlled. FIG. 11 shows a remote control switching unit 148 having a plurality of push buttons thereon. Connected to remote switching unit 148 is an electrical cord 150 having a plurality of insulated electrical conductors therein. The free end of cord 150 has an attached male electrical plug 152. Male plug 152 plugs into female electrical socket 154 on truck 12 shown in FIG. 13. Remote switching unit 148 in FIG. 13 is shown resting removably within a tray 156 adjacent the handle 158, both tray 156 and handle 158 are attached to end chute section 76 of chute 10. Handle 158 may be utilized for human operator 14 to stabilize himself as shown in FIG. 1, or for manually pulling chute 10 left and right of truck 12, pivotally about the vertical axis if motor 36 is not used, a situation which is possible, but not highly recommended due to the weight of chute 10 especially when filled with cement 11. From where remote switching unit 148 removably rests in tray 156, cord 150 extends toward truck 12 where the cord 150 is preferably retained within a spring biased cord reel 160. Cord reel 160 is a conventionally structured cord reel used to pay out cord 150 as chute 10 extends, and to wind cord around a drum as chute 10 is retracted. The free end of cord 150 having male plug 152 removably plugs into female socket 154. Operator 14 may push the buttons of switching unit 148 to control movement of chute 10 with the remote switching unit 148 resting in tray 156, or the operator 14 may lift switching unit 148 out of tray 148 and hold the unit 148 in his hand as he stands adjacent the dispensing end 16 of chute 10.

Shown in FIG. 12 is remote switching unit 18, which is a hand held remote switching unit having a plurality of buttons thereon. Remote switching unit 18 is a battery powered wire-less remote control unit, in that it transmits encoded radio frequency signals to a receiver unit 162. Receiver 162 utilizes electrical power from the truck 12 operational system. Receiver unit 162 receives the encoded radio frequency signals from remote switching unit 18, decodes the signals, and by way of additional known components such as solenoid controlled contactors and electrical conductors, actuates the proper hydraulic control valve 108 attached to truck 12 to provide operator 14 with the desire movement in chute 10. Generally a reversible control valve 108 is used for each hydraulic component of chute 10, for example hydraulic ram 29 is controlled by a valve 108, motor 36 is controlled by a valve 108, and a set of rams 94 or 133 for moving the chute sections inward and outward are controlled by a single control valve 108. Four control valves 108 are shown in FIG. 13, wherein the forth valve 108 is for controlling chute vibrator 164, which will be explained later. It should be noted that a large variety of hydraulic control valves are available which would function well for the desired task, some of which are ganged or gangable into what appear as single units capable of controlling flow through many hydraulic hoses. Additionally, control valves 108 have a neutral position, wherein no fluid flows through the valves 108.

Electrical conductors extend for female socket 154 and from receiver 162 and connect to the electrical wires which control the solenoids of control valves 108, and these conductors to valves 108 may be wired in a parallel circuit so either remote switching unit 18 or 148 may be used to control movement of chute 10. The use of remote switching units 18 and 148 are shown as examples, and both examples do not have to be utilized on a single truck 12. The push buttons for actuating the internal switches of both remote switching units 18 and 148 operate normally open contacts within the units 18, 148, and the switches should be momentary contact only. The push bottoms should be clearly labeled for operator 14 to know which mode he is actuating when he presses one of the buttons, and should include the following: chute up 166, chute down 168, chute extend 170, chute retract 172, chute left 174, chute right 176, drum 22 rotation clockwise 178, drum 22 rotation counterclockwise 180, back-up signal 182, move forward signal 184, vibrate chute 186, and auxiliary for future use 188, for sounding a chute movement audible alarm for example for added safety.

The buttons 178 and 180 are optionally used when it is desired to control the direction of drum 22, which determines whether drum 22 dispenses into chute 10 or not, and a valve 108 to be connected to the reversible hydraulic motor normally used to rotate drums 22 of trucks 12. Buttons 182 and 184 are optionally used in combination with two signal lights within the operator's cab of truck 12 to signal the truck driver to move the truck 12 forward or move in reverse, truck movements periodically needed even with telescopic chutes, although much less often than with other types of chutes.

Since chute 10 directs cement 11 using gravity flow, chute 10 must be at a slight angle when dispensing. If chute 10 is not sufficiently sloped, the cement 11 will not flow properly. The height of trough portion 43 of chute 10 is restricted by the height of the dispensing opening of the drum 22 of truck 12, thus limiting the maximum distance chute 10 can extend away from truck 12 and still have sufficient slope. In order to allow chute 10 to extend a greater distance and still have the cement 11 flow through chute 10 at a reasonable rate, I have attached a hydraulically driven chute vibrator 164 to chute 10 to vibrate the chute 10 and aid in causing flowing of the cement 11 when there is very little slope in the chute 10. Vibrator 164 is shown in FIG. 3 attached to plate 56 of first chute section 40, a location where the hydraulic hoses could be kept short, and where vibrator 164 has been found most effective in vibrating the entire chute 10.

Since my invention has been described and shown in the drawings in significant detail, it should be noted changes could be made to the structures described without departing from the spirit and scope of the invention, and therefore the scope of the invention should be determined by the broadest reasonable interpretation of my attached claims.

What I claim as my invention is:

1. A telescopic chute mounted on a mixer truck, said telescopic chute comprising an assemblage of a plurality of elongate chute sections movably affixed one chute section to another chute section to provide means for shortening and lengthening the telescopic chute by way of inward and outward movement of said chute sections relative to each other and relative to said mixer truck, said telescopic chute mounted to said mixer truck with chute attachment means so as to position the telescopic chute to receive dispensed flowable material from a drum of said mixer truck, said chute attachment means including pivotal structuring to permit movement of the telescopic chute about a vertical axis, said chute attachment means further including pivotal structuring to permit movement of the telescopic chute about a horizontal axis, first powering means affixed at least in part to the telescopic chute with said first powering means including means for actuating the telescopic chute about said horizontal axis, second powering means affixed to the telescopic chute for actuating said inward and outward movement of said chute sections, said second powering means including a plurality of fluid powered linear extendable and retractable rams attached to said chute sections, each of said rams comprising, a housing containing a portion of an elongated slidable cylinder rod, a piston affixed to said cylinder rod within said housing, said piston dividing an interior of said housing into a first chamber and a second chamber, a portion of said cylinder rod extending out of said housing, a first opening and a second opening in said portion of said cylinder rod extending out of said housing, said first opening being in communication with a first conduit within said cylinder rod, said second opening being in communication with a second conduit within said cylinder rod, said first conduit further including an opening into said first chamber of said housing, said second conduit further including an opening into said second chamber of said housing.

* * * * *